Figure 1:
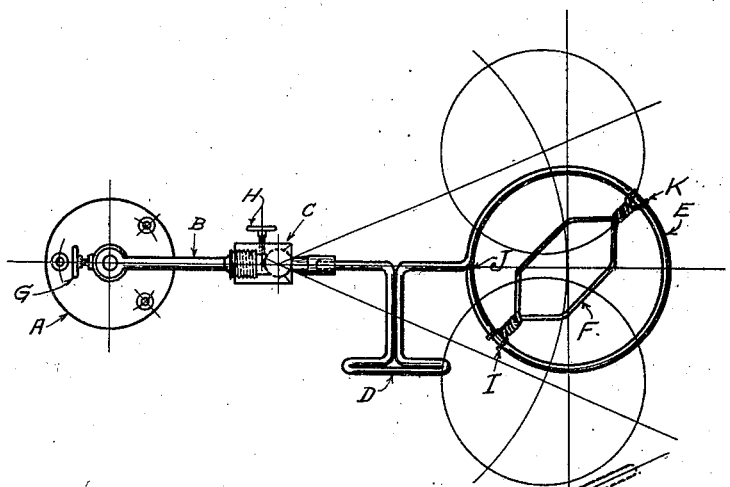

J. H. DYBLIE.
DENTAL SOLDERING STAND.
APPLICATION FILED APR. 26, 1920.

1,435,456.

Patented Nov. 14, 1922.

Witnesses:

Inventor:
John H. Dyblie

Patented Nov. 14, 1922.

1,435,456

UNITED STATES PATENT OFFICE.

JOHN H. DYBLIE, OF JOLIET, ILLINOIS.

DENTAL SOLDERING STAND.

Application filed April 26, 1920. Serial No. 376,573.

*To all whom it may concern:*

Be it known that I, JOHN H. DYBLIE, a citizen of the United States, and a resident of the city of Joliet, county of Will, and State of Illinois, have invented certain new and useful Improvements in Dental Soldering Stands, of which the following is a full, clear, and exact description.

The primary object of the present invention is to provide an improved soldering stand for the dental laboratory. It may, however, be used in other lines of work where its working principle can be applied.

Heretofore, it has been customary to solder dental work such as crowns, bridges and regulating appliances on a more or less stationary burner and screen. My improved soldering stand enables the operator to move the dental work during the soldering operations to any position required relative to the burner and blowpipe.

The invention consists of improved features hereinafter described, illustrated in the accompanying drawing and particularly pointed out in the claims at the end of this specification. Like letters refer to like parts in the several views of the drawing.

Figure 2:
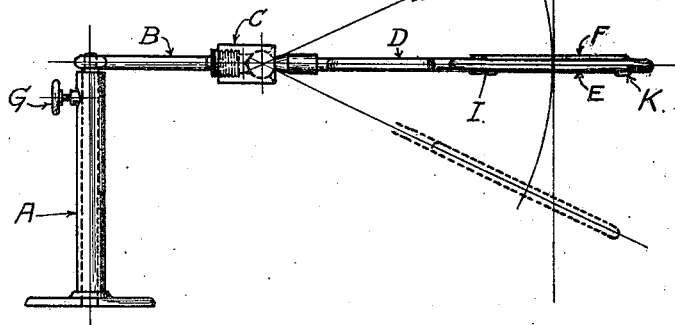

Fig. 1 is a plan view of soldering stand.
Fig. 2 is a vertical view of same.

Referring to the drawing "A" indicates a hollow tubular stand. Into the tube part of stand "A" slides a round rod. To the upper end of this rod is attached member "B" adjustable for height and rotation over a burner. Threaded into upper end of stand "A" is a thumb screw "G" for locking the member "B" in adjusted position. A wire "E" is attached to the member "B" by means of an adjustable ball and socket connection whereby universal movement of the frame "E" is obtained. The ball and socket connection comprises the internally threaded sleeve or nut "C" which is secured to rod "B" and the ball extension on frame "E." Into this sleeve is threaded a set screw "H" for preventing relative rotation of the parts. The member "B" has an extension beyond the threaded portion which bears on the ball to produce the desired amount of resistance to its rotation in the nut.

Investment frame "F" is a receptacle of suitable rigidity and size preferably constructed of two pieces of wire twisted together to form an oblong frame and having formed at its two extreme ends, an arm projecting outwardly from diametrically opposite points on the frame and terminating in the open jaws "I" and "K" said jaws being of such size that they fit loosely in the wire ring of frame "E," thus allowing for a rotary movement of the investment frame in the ring. The frame "E" may also be turned completely over without the investment frame "F" dropping out.

The frame "E" comprises a circular spring wire ring which is open at "J," to allow for the insertion and removal of frame "F," but has sufficient tension to keep the ring closed and a handle "D" consisting of a stem and a grip formed on the wire between the ring and ball extension of frame "E," said stem being at right angles to the wire connection of the ring and ball extension, the grip lying parallel thereto. It will be evident that the frame may be tilted or turned by means of the handle.

Bridges or regulation appliances are embedded in plaster in the investment frame F to hold the work securely in place; said frame is then placed into the ring of frame "E."

A slight push with the soldering pliers or the blow pipe is sufficient to get the desired working position of the investment frame.

It is manifest that details of construction above described may be varied without departing from the spirit of the invention.

Having described my invention and set forth its merits, which I claim as new and desire to secure by Letters Patent is:

1. A device of the character specified, comprising an open ended flexible circular spring wire frame, a wire investment frame consisting of two pieces of wire twisted together to form an oblong frame, and having formed at its two extreme ends an arm projecting outwardly from diametrically opposite points on the frame and terminating in open jaws engaging the upper and lower edge of the circular spring frame, to hold the investment frame frictionally in any position.

2. A device of the character specified, comprising a support, a rod attached to said support, an open ended flexible circular spring frame at the end of said rod, and a wire investment frame consisting of two pieces of wire twisted together to form an oblong frame, and having formed at its two extreme ends an arm projecting outwardly from diametrically opposite points on the frame and terminating in open jaws, engaging the upper and lower edge of the open ended circular spring frame, and being insertable therein, and removable therefrom.

3. A device of the character specified, comprising a support, a rod attached to said support, an open ended flexible circular spring frame at the end of said rod, and a wire investment frame consisting of two pieces of wire twisted together to form an oblong frame, and having formed at its two extreme ends an arm projecting outwardly from diametrically opposite points on the frame and terminating in open jaws, engaging the upper and lower edge of the open ended circular spring frame, and slidingly mounted to allow for the rotation of the investment frame in the circular spring frame.

4. A device of the character specified, comprising a support, a rod attached to said support, an open ended flexible circular spring frame at the end of said rod and a wire investment frame consisting of two pieces of wire twisted together to form an oblong frame, and having formed at its two extreme ends an arm projecting outwardly from diametrically opposite points on the frame and terminating in open jaws, engaging the upper and lower edge of the circular spring frame so that the said spring frame may be turned completely over without the investment frame dropping out.

JOHN H. DYBLIE.

Witnesses:
JULIUS A. DYBLIE,
O. C. DAVIS.